United States Patent
Park

(10) Patent No.: US 8,350,943 B2
(45) Date of Patent: Jan. 8, 2013

(54) DIGITAL CAMERA

(75) Inventor: Hwan-soo Park, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 344 days.

(21) Appl. No.: 12/853,984

(22) Filed: Aug. 10, 2010

(65) Prior Publication Data

US 2011/0194009 A1 Aug. 11, 2011

(30) Foreign Application Priority Data

Feb. 9, 2010 (KR) ........................ 10-2010-0012030

(51) Int. Cl.
*H04N 5/222* (2006.01)
*H04N 5/225* (2006.01)
(52) U.S. Cl. .................... 348/333.01; 348/371; 348/373
(58) Field of Classification Search ............ 348/333.01, 348/371, 373
See application file for complete search history.

(56) References Cited

U.S. PATENT DOCUMENTS

| | | | | |
|---|---|---|---|---|
| 7,180,546 B2* | 2/2007 | Kobayashi | ............. | 348/374 |
| 7,321,470 B2* | 1/2008 | Matsumoto et al. | .......... | 359/694 |
| 7,952,640 B2* | 5/2011 | Yamamiya | ............. | 348/373 |
| 8,189,098 B2* | 5/2012 | Maruyama et al. | ........... | 348/374 |
| 2005/0200748 A1* | 9/2005 | Lee et al. | ............. | 348/373 |
| 2010/0149398 A1* | 6/2010 | Gayer | ............. | 348/333.01 |

* cited by examiner

*Primary Examiner* — James Hannett
(74) *Attorney, Agent, or Firm* — Drinker Biddle & Reath LLP

(57) ABSTRACT

A digital camera includes a first frame formed of a thermal conductive material; an imaging unit disposed in front of the first frame; an optical system including lenses and focusing image light on the imaging unit; a first display unit disposed on a rear portion of the first frame; a first heat generator that located at a side surface of the optical system and disposed on a front portion of the first frame; a second heat generator disposed on a front portion of the first heat generator; a second frame formed of a thermal conductive material, and disposed between the first heat generator and the second heat generator; a third frame formed of a thermal conductive material, and disposed on a front portion of the second heat generator; and a second display unit disposed on a front portion of the third frame.

17 Claims, 12 Drawing Sheets

DIGITAL CAMERA

CROSS-REFERENCE TO RELATED PATENT APPLICATION

This application claims the benefit of Korean Patent Application No. 10-2010-0012030, filed on Feb. 9, 2010, in the Korean Intellectual Property Office, the disclosure of which is incorporated herein in its entirety by reference.

BACKGROUND

Various embodiments of the invention relate to a digital camera, and more particularly, to a digital camera capable of reducing heat generated by internal elements thereof.

Digital cameras, which have been replacing film cameras more and more, are apparatuses for converting light reflected from a subject to an electric signal to be stored as digital data, processing the stored image, or reproducing the image.

Since digital cameras have various electronic components, heat is generated inside the digital camera. In particular, a display device, a printed circuit board (PCB), and a battery chamber generate a lot of heat. The internal heat is transferred to a cover of the digital camera, which is formed of a metal material, and thus, a user of the digital camera may feel uncomfortable due to the heat or may misunderstand the heat as a malfunction of the digital camera.

As fabrication technologies of semiconductor devices have developed rapidly and consumer demand has become more varied, digital cameras have become smaller and thinner; however, the number of components installed in the digital camera has increased. For example, digital cameras having a plurality of display devices have been developed, and it is difficult to discharge the heat generated by the display devices. In addition, since the PCB in the digital camera is designed to have as small a size as possible, there is a limitation in reducing the heat generated by the PCB.

SUMMARY

Various embodiments of the invention provide a digital camera including a plurality of display devices, as well as a digital camera, in which generated heat may be easily reduced.

According to an embodiment of the present invention, there is provided a digital camera including: a first frame formed of a thermal conductive material; an imaging unit disposed in front of the first frame for converting image light into an electric signal; an optical system including lenses and disposed in front of the imaging unit to focus the image light on the imaging unit; a first display unit disposed on a rear portion of the first frame; a first heat generator located at a side surface of the optical system and disposed on a front portion of the first frame, wherein the first heat generator generates heat; a second heat generator disposed on a front portion of the first heat generator, wherein the second heat generator generates heat; a second frame formed of a thermal conductive material, and disposed between the first heat generator and the second heat generator; a third frame formed of a thermal conductive material, and disposed on a front portion of the second heat generator; and a second display unit disposed on a front portion of the third frame.

The digital camera may further include a thermal conductive sheet disposed between the first frame and the first display unit to transfer the heat generated by the first display unit to the first frame.

The first heat generator may be a circuit board, and the second heat generator may be a battery.

The first heat generator may be a battery and the second heat generator may be a circuit board.

The first frame may include a first accommodation hole surrounding an edge of the imaging unit.

The digital camera may further include a thermal conductive sheet disposed between the first frame and the first display unit to transfer the heat generated by the first display unit to the first frame, and the thermal conductive sheet may have a second accommodation hole at a location corresponding to that of the first accommodation hole of the first frame.

The second frame may include a plurality of ventilation holes for guiding air to flow between the first heat generator and the second heat generator.

The third frame may include a plurality of ventilation holes for guiding air to flow between the second heat generator and the second display unit.

The first display may have a size that covers regions corresponding to the optical system and the second display unit, and the first frame may have a size corresponding to the first display unit so that the heat generated in a region where the first display unit and the second display unit overlap with each other may be transferred to a region where the optical system is located.

The digital camera may further include a rear cover which includes a rear display window formed at a location corresponding to the first display unit and is disposed on a rear portion of the first display unit to surround an edge of the first display unit.

The digital camera may further include a front cover which includes an imaging window that receives the optical system and a front display window formed at a portion corresponding to the second display unit, and is coupled to the front portion of the second display unit.

BRIEF DESCRIPTION OF THE DRAWINGS

The above and other features and advantages will become more apparent by describing in detail exemplary embodiments thereof with reference to the attached drawings in which.

DETAILED DESCRIPTION

Hereinafter, structures and operations of a digital camera according to embodiments of the invention will be described with reference to accompanying drawings.

Figure 1:
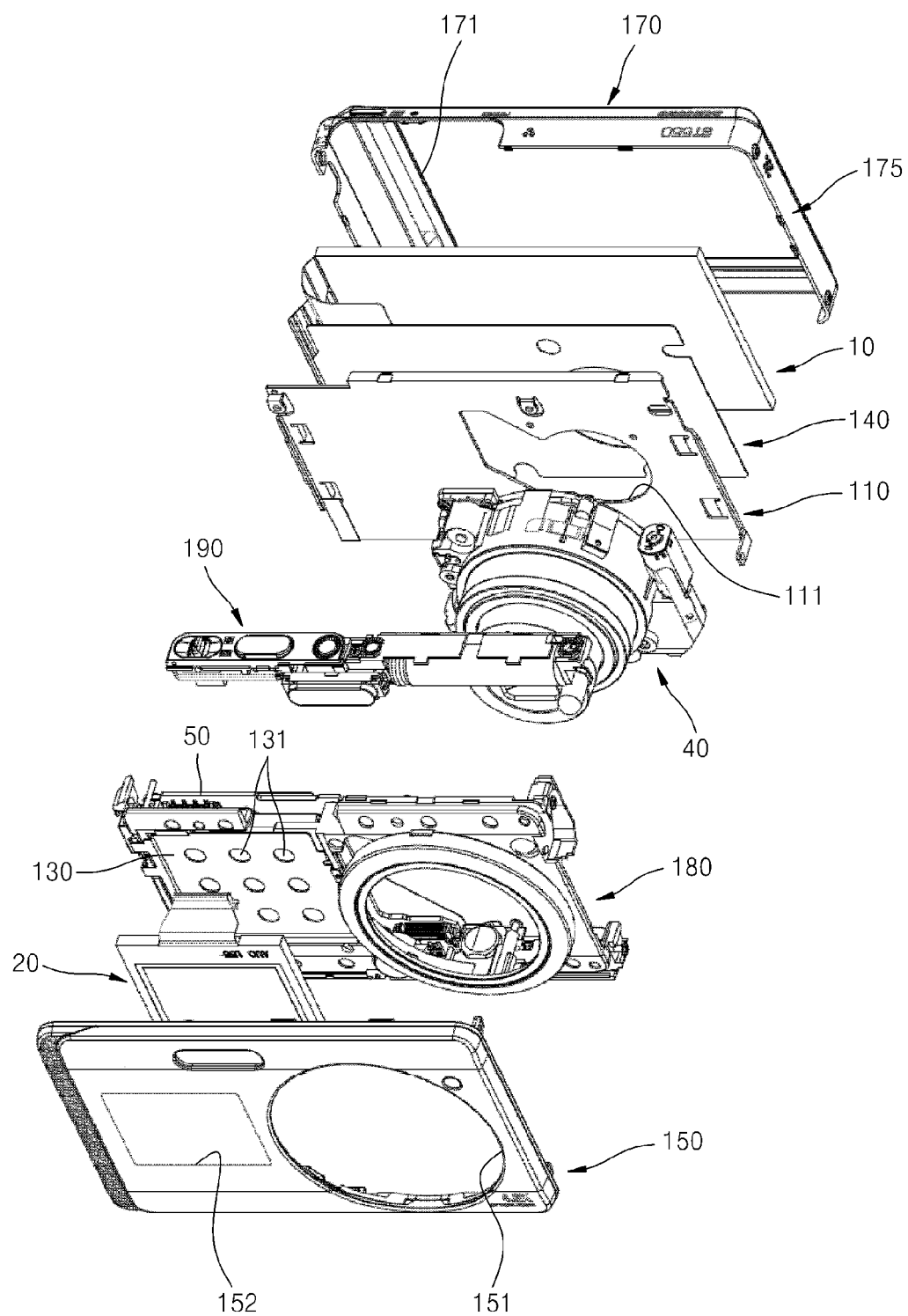
FIG. 1 is an exploded perspective view showing components in a digital camera according to an embodiment of the invention.
Figure 2:
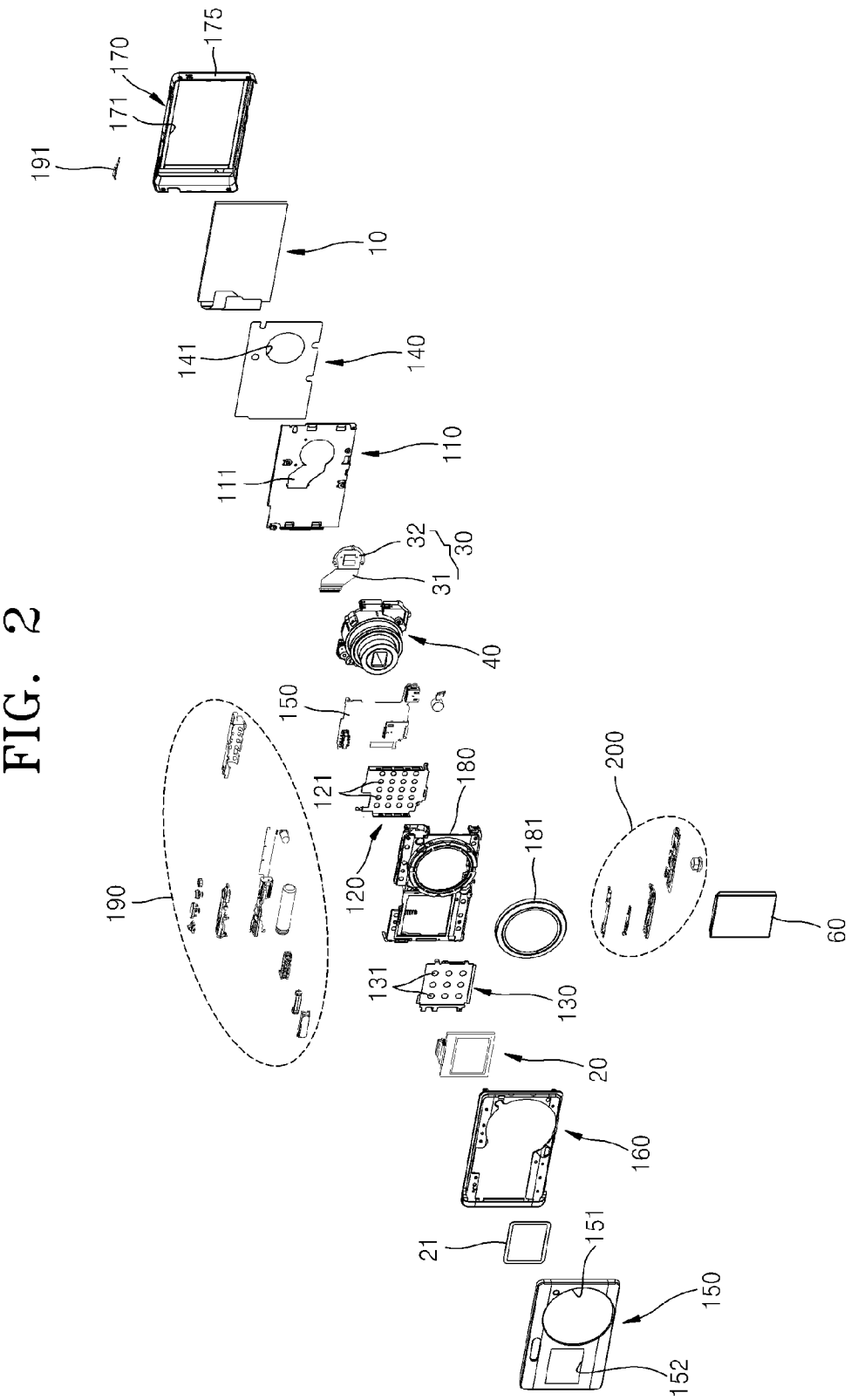
FIG. 2 is an exploded perspective view showing the components of the digital camera shown in FIG. 1 in detail.

FIG. 1 is an exploded perspective view showing components in a digital camera according to an embodiment of the invention, and FIG. 2 is an exploded perspective view showing the components of the digital camera of FIG. 1 in more detail.

The digital camera of the current embodiment includes a first frame 110, an imaging unit 30 disposed in front of the first frame 110, an optical system 40 disposed in front of the imaging unit 30, a first display unit 10 disposed on a rear portion of the first frame 110, a printed circuit board (PCB) 50 that is a first heat generator disposed on a front portion of the first frame 110, a second frame 120 disposed in front of the PCB 50, a battery 60 that is a second heat generator disposed in front of the second frame 120, a third frame 130 disposed in front of the battery 60, and a second display unit 20 disposed in front of the third frame 130.

Although the digital camera having the above structure includes various heating elements, for example, the plurality of display devices such as the first display unit 10 and the second display unit 20, the PCB 50, and the battery 60, the digital camera also includes heat transferring structures for reducing the heat, that is, the first frame 110, the second frame 120, and the third frame 130 between the heating elements. Thus, the generated heat in the digital camera may be efficiently dissipated.

In addition, since the elements generating the heat share the heat transferring structures with each other, a very thin digital camera may be fabricated.

A thermal transfer sheet 140 may be disposed between the first frame 110 and the first display unit 10. The thermal transfer sheet 140 rapidly transfers the heat generated by the first display unit 10 to the first frame 110.

The first frame 110 may be fabricated by pressing a metal plate formed of a thermal conductive material such as aluminum or stainless steel. The first frame 110 may include a first accommodation hole 111 surrounding an edge of the imaging unit 30. The thermal transfer sheet 140 may also include a second accommodation hole 141 at a location corresponding to the first accommodation hole 111 to accept the edge of the imaging unit 30. Since the edge of the imaging unit 30 is accommodated in the first accommodation hole 111 and the second accommodation hole 141 when the digital camera is assembled, an increase in thickness of the digital camera due to the imaging unit 30 may be minimized.

The digital camera according to the current embodiment is not limited by the material forming the first frame 110 or the fabrication method of the first frame 110, and the first frame 110 may be formed of, for example, an alloy including copper. In addition, the first frame 110 may be fabricated by machining sheet metal or casting a metal thin film, as well as by using the pressing method.

The imaging unit 30 is disposed in front of the first frame 110 to convert image light into an electric signal. The imaging unit 30 includes an imaging device 32 for converting the image light into the electric signal and a wiring unit 31 for transferring the electric signal of the imaging device 32 to outside of the imaging unit 30 and transferring an external control signal to the imaging device 32.

The imaging device 32 may include a photoelectric conversion device, for example, a charge-coupled device (CCD) or a complementary metal oxide semiconductor (CMOS), and converts the image light incident through the optical system 40 into an image signal that is an electric signal. The conversion process of the image light into the electric signal may include a process of converting the image light into an analog signal, and a process for converting the analog signal to the digital signal.

The optical system 40 includes a plurality of lenses, a zoom type lens barrel assembly for changing locations of the lenses, and a driving unit such as a motor. The optical system 40 focuses the image light on the imaging unit 30. The optical system 40 of the present embodiment uses a collapsible lens barrel type, in which a lens barrel is extracted or contracted in a back-and-forth direction in order to perform a zooming function and a focusing function.

The first display unit 10 and the second display unit 20 may use liquid crystal displays (LCD) or organic light emitting diodes (OLEDs).

The PCB 50 that is the first heat generator is disposed on a side surface of the optical system 40 on the front portion of the first frame 110. The PCB 50 may include a control circuit for processing control signals transferred to the components of the digital camera, an image processing circuit for processing digital signals relating to the images, and a power circuit for managing power supplied to each of the components in the digital camera. Although the power circuit and the image processing circuit generate a lot of heat, the generated heat may be rapidly transferred to the first frame 110 having a size greater than that of the PCB 50.

The second frame 120 is disposed in front of the PCB 50, and the battery 60 that is the second heat generator is disposed in front of the second frame 120. The battery 60 supplies electric power to the components such as the PCB 50, and generates a lot of heat. The battery 60 may be stably supported in front of the second frame 120 by a supporting structure 200.

The second frame 120 absorbs the heat generated by the PCB 50 and the battery 60. The second frame 120 includes a plurality of ventilation holes 121 which guide discharging of the heated air out of a space in which the PCB 50 and the battery 60 are installed.

The second frame 120 may be fabricated by pressing a metal plate formed of aluminum or stainless steel. However, the present invention is not limited thereto, that is, the second frame 120 may be formed of an alloy including copper by using the machining process of the metal sheet or casting of a thin metal plate.

A main body chamber 180 is disposed between the second frame 120 and the third frame 130. The main body chamber 180 supports the optical system 40, the second frame 120, and the third frame 130. A ring 181, having an esthetic function, is coupled to a front portion of the main body chamber 180 to be exposed protruding from a front surface of the digital camera.

The third frame 130 that is formed of a thermal conductive material is disposed in front of the battery 60. The second display unit 20 that may function as an auxiliary display device is disposed on the front portion of the third frame 130.

Since both the battery 60 and the second display unit 20 generate a lot of heat, the battery 60 and the second display unit 20 may share the third frame 130 that is formed of the thermal conductive material therebetween, and thus, the generated heat may be rapidly absorbed by the third frame 130.

The third frame 130 includes a plurality of ventilation holes 131 which guide discharging of the heated air, which is in the space where the battery 60 and the second display unit 20 are disposed, to another space, so that the heated air does not remain in the space.

The third frame 130 may be fabricated by pressing a metal plate formed of a thermal conductive material such as aluminum or stainless steel. However, the present invention is not limited thereto, that is, the third frame 130 may be formed of an alloy including copper by using the machining process of the metal sheet or casting of the thin metal plate.

A front inner cover 160 and a protective pad 21 are coupled to the front portion of the second display unit 20. A front cover 150 is coupled to the front-most portion of the digital camera. The front cover 150 includes an imaging window 151 for receiving the optical system and a front display window 152 that is opened at a location corresponding to the second display unit 20. The front cover 150 may be fabricated by using a plastic or a metal material in order to protect inner components of the digital camera.

A rear cover 170 is disposed on a rear portion of the first display unit 10, and the rear cover 170 includes a rear display window 171 that is formed at a location corresponding to the first display unit 10. The rear cover 170 may also be fabricated by using the plastic or metal in order to protect the inner components of the digital camera.

A side cover 175 is connected to the rear cover 170. The side cover 175 is extended forward in order to cover at least some edges of at least one of the first frame 110, the second frame 120, the third frame 130, the battery 60, the PCB 50, the first display unit 10, and the second display unit 20.

In the present embodiment, since the second display unit 20 is attached to the front cover 150, the side cover 175 does not cover the edges of the second display unit 20. However, the second display unit 20 may be fabricated to have larger size, and the side cover 175 may be modified to cover a part of the edges of the second display unit 20.

An upper assembly 190 including an upper cover, a zoom button, a release button, a power button, and a microphone, and a key button 191 are installed on an upper end portion of the digital camera.

Figure 3:
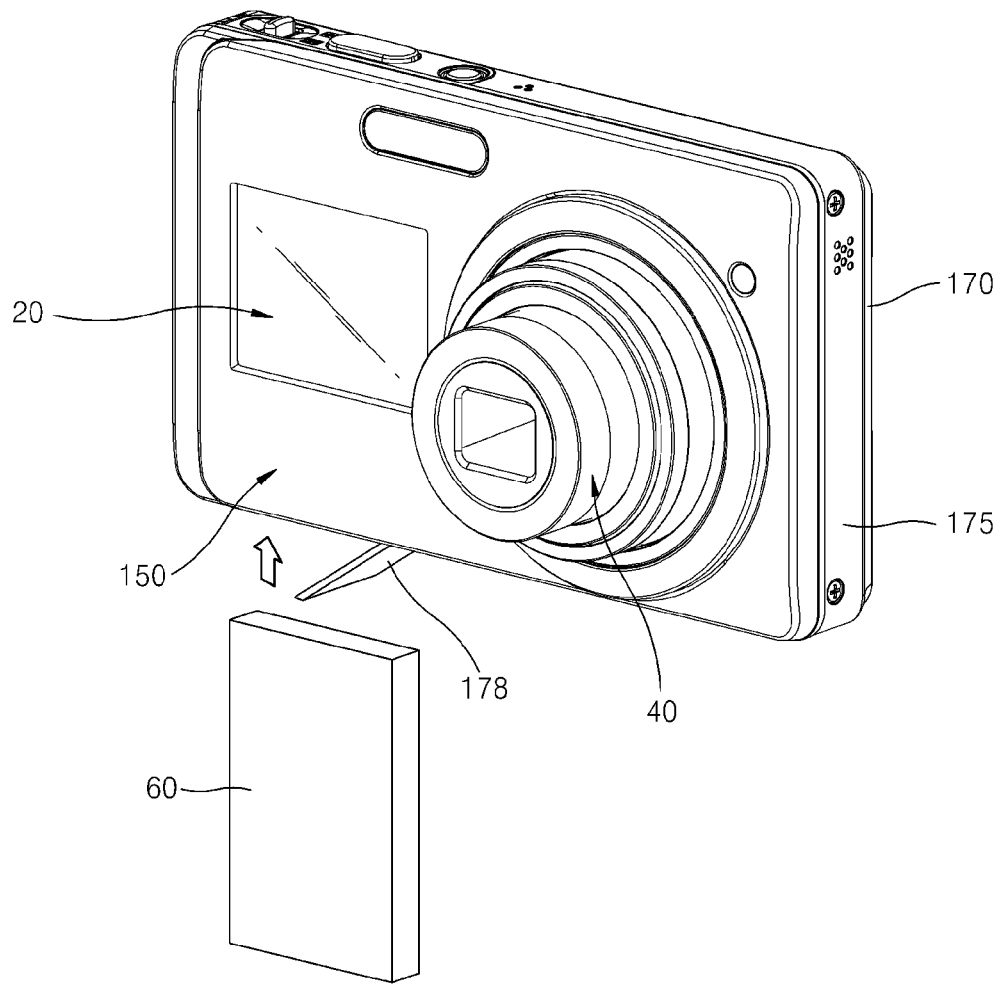
FIG. 3 is a perspective view showing a front portion of the digital camera of FIG. 1.
Figure 4:
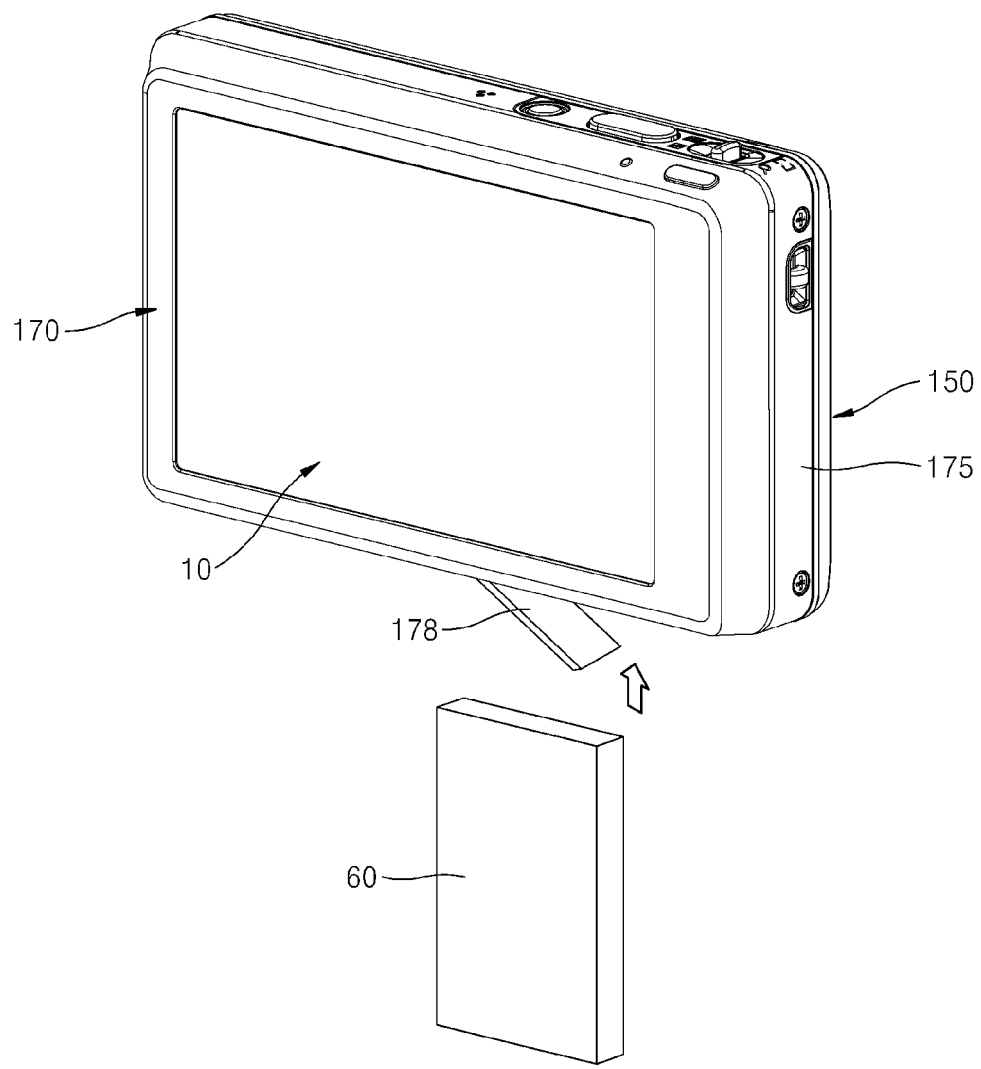
FIG. 4 is a perspective view showing a rear portion of the digital camera of FIG. 1.

FIG. 3 is a perspective view showing a front portion of the digital camera of FIG. 1, and FIG. 4 is a perspective view showing a rear portion of the digital camera of FIG. 1.

As shown in FIG. 3, the second display unit 20 is seen from a front portion of the front cover 150 of the digital camera. A user of the digital camera may identify photographing information such as focusing information or driving information via the second display unit 20 while photographing himself/herself.

In addition, as shown in FIG. 4, the first display unit 10 is disposed on the rear cover 170 of the digital camera. The user may identify the image captured by the optical system 40 by using the first display unit 10, and use various menus for manipulating the digital camera.

The side cover 175 surrounding the side surface of the digital camera includes a battery cover 178 to be rotatable at a portion in which the battery 60 is inserted.

Figure 5:
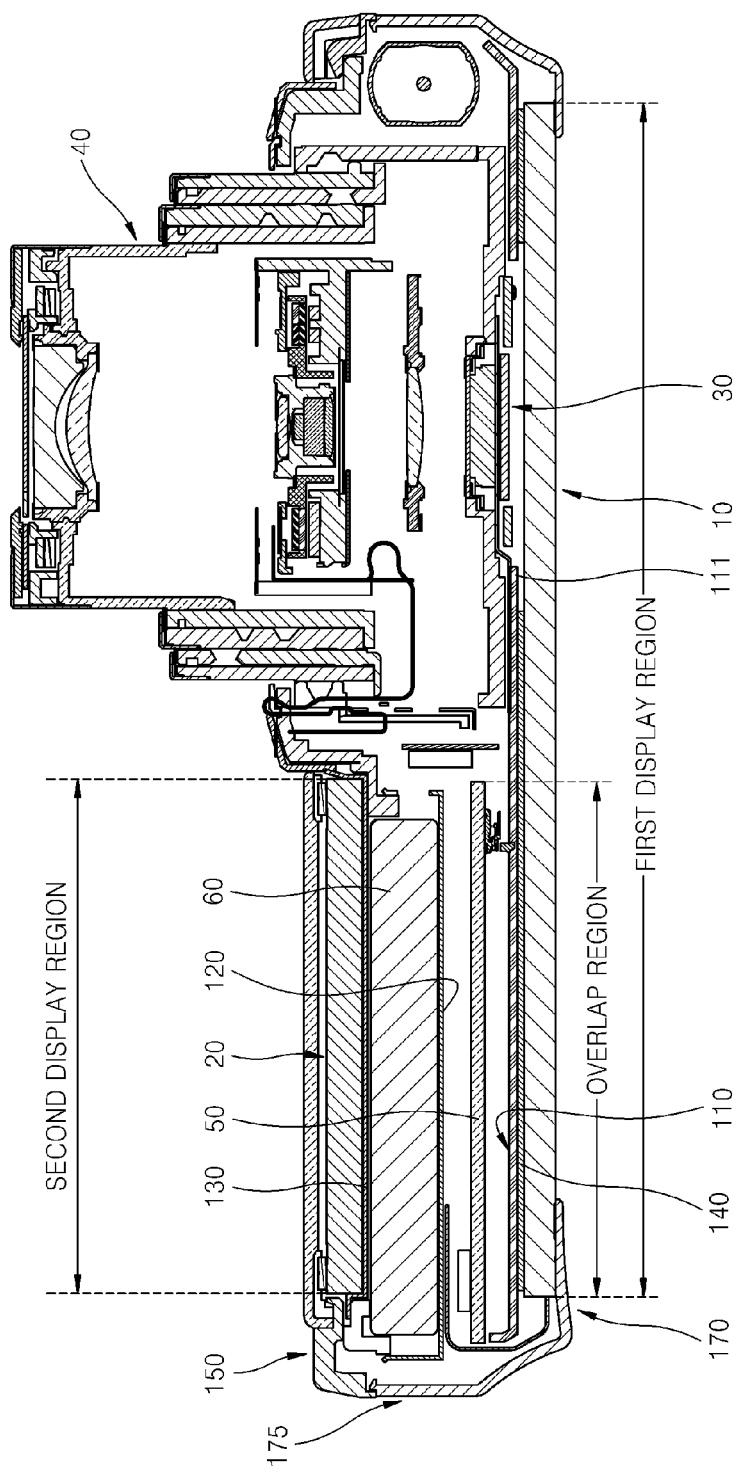
FIG. 5 is a transverse cross-sectional view of the digital camera of FIG. 3.
Figure 6:
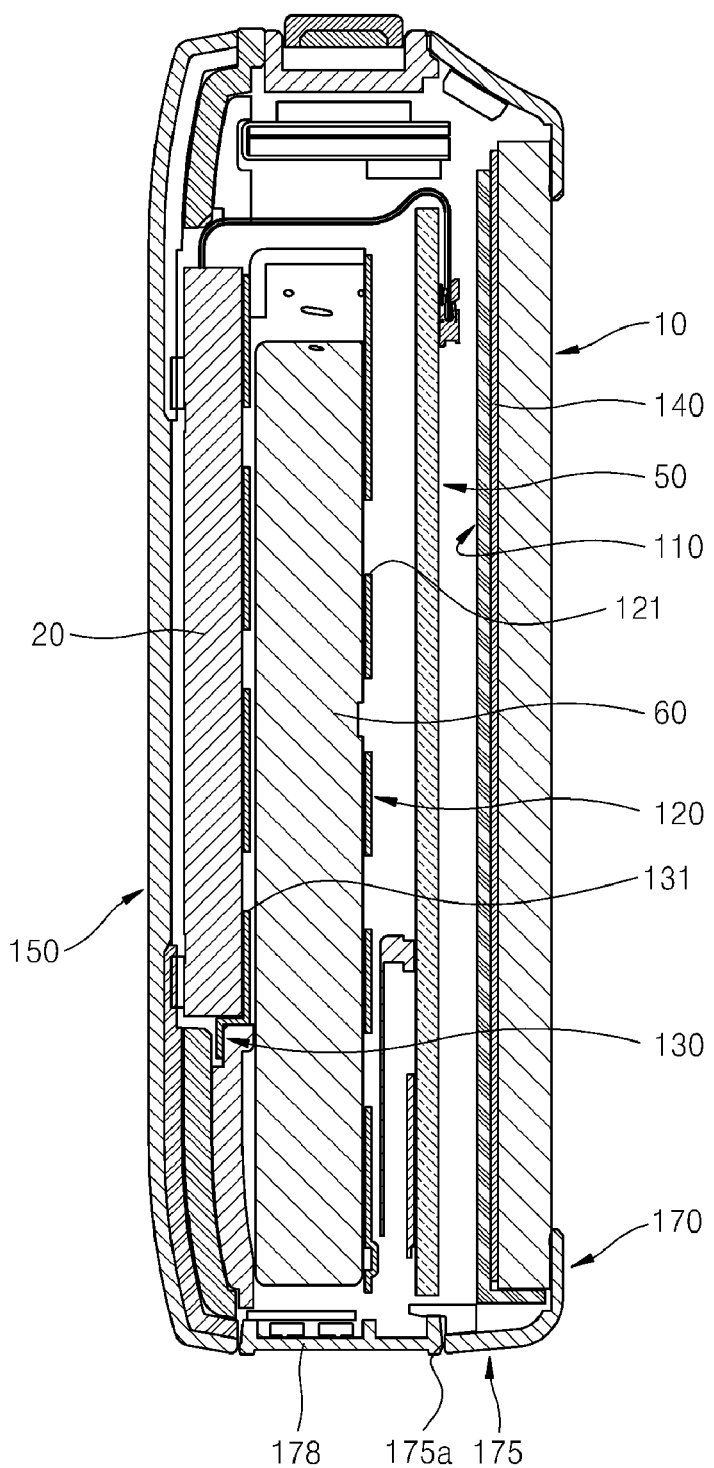
FIG. 6 is a longitudinal cross-sectional view of the digital camera of FIG. 3.

FIG. 5 is a transverse cross-sectional view of the digital camera shown in FIG. 3, and FIG. 6 is a longitudinal cross-sectional view of the digital camera shown in FIG. 3.

Referring to FIG. 5, the optical system 40 is disposed on a right side of the drawing, and the second display unit 20 is disposed at a former left portion of the optical system 40. The first display unit 10 is disposed on the rear side of the digital camera. Since the first display unit 10 has a width that is greater than that of the second display unit 20, a first display region occupied by the first display unit 10 covers a second display region occupied by the second display unit 20 and the optical system 40.

At a left side of FIG. 5, an overlap region, in which the second display region and the first display region overlap each other, is located. In the overlap region, the first display unit 10, the second display unit 20, the PCB 50, and the battery 60, which generate the heat, are arranged to overlap each other, and thus, the temperature at the overlap region is the highest since the generated heat is concentrated in that region when the digital camera is operated.

Since the first frame 110 is attached to the first display unit 10 as interposing the thermal transfer sheet 140 between the first frame 110 and the first display unit 10, the heat may be dispersed to the right side of the first frame 110, that is, the portion where the optical system 40 is located.

Referring to FIG. 6, the second frame 120 that is formed of the thermal conductive material and disposed between the PCB 50 and the battery 60, and the third frame 130 that is formed of the thermal conductive material and is disposed between the battery 60 and the second display unit 20, rapidly absorb the heat generated by the PCB 50, the battery 60, and the second display unit 20. At the same time, the heated air in the overlap region may be dispersed through the ventilation holes 121 and 131.

The side cover 175 is disposed to cover at least some edges of at least one of the first frame 110, the second frame 120, the third frame 130, the battery 60, the PCB 50, and the first display unit 10. An inlet hole 175a, in which the battery 60 is inserted, is formed in the side cover 175. The battery cover 178 is installed on the side cover 175 to be rotatable so as to open or close the inlet hole 175a.

The second frame 120 and the third frame 130 are disposed to extend toward the inlet hole 175a so as to guide the movement of the battery 60 when the battery 60 is inserted through the inlet hole 175a. In addition, when the battery 60 is completely inserted in the digital camera through the inlet hole 175a, the second frame 120 and the third frame 130 respectively contact both surfaces of the battery 60 to receive the battery 60 and cool down the heat generated from the battery 60.

Figure 7:
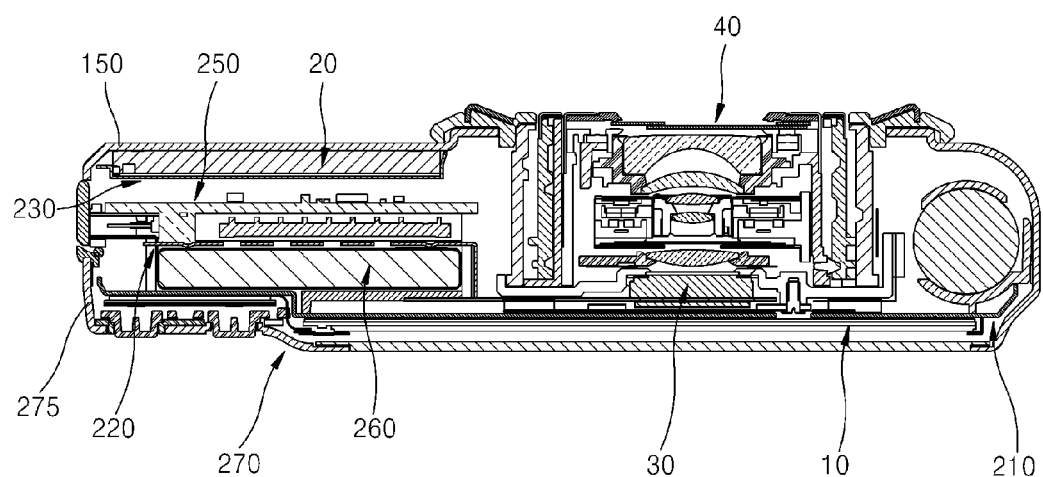
FIG. 7 is a transverse cross-sectional view of a digital camera according to another embodiment of the present invention.
Figure 8:
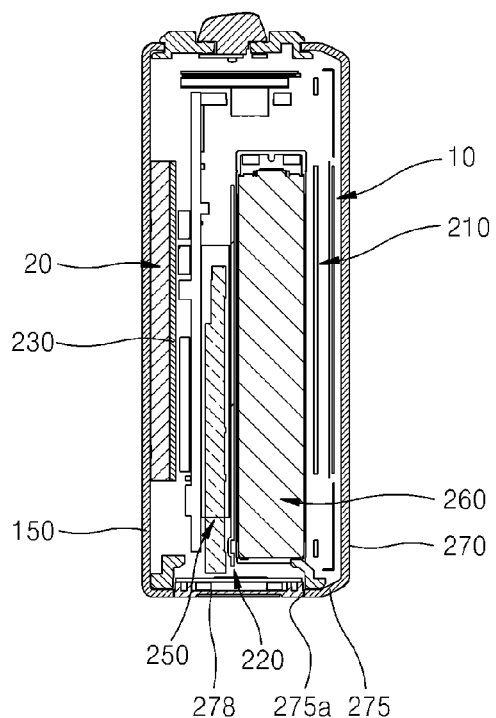
FIG. 8 is a longitudinal cross-sectional view of the digital camera of FIG. 7.

FIG. 7 is a transverse cross-sectional view of a digital camera according to another embodiment of the present invention, and FIG. 8 is a longitudinal cross-sectional view of the digital camera of FIG. 7.

The digital camera shown in FIGS. 7 and 8 includes a first frame 210, the imaging unit 30 disposed on a front portion of the first frame 210, the optical system 40 disposed on a front portion of the imaging unit 30, the first display unit disposed on a rear portion of the first frame 210, a battery 260 that is a first heat generator disposed on a front portion of the first frame 210, a second frame 220 disposed on a front portion of the battery 260, a PCB 250 that is a second heat generator disposed on a front portion of the second frame 220, a third frame 230 disposed on a front portion of the PCB 250, and the second display unit 20 disposed on a front portion of the third frame 230.

The optical system 40 of the digital camera shown in FIGS. 7 and 8 also uses a collapsible lens barrel type, in which a lens barrel is extended or contracted in a back-and-forth direction in order to perform the zooming function and the focusing function.

Unlike the digital camera illustrated in FIGS. 1 through 6, locations of the battery 260 and the PCB 250 are changed in the digital camera of FIGS. 7 and 8. Therefore, the heat generating between the battery 260 and the first display unit 10 may be cooled down by the first frame 210, and the heat generating between the PCB 250 and the second display unit 20 may be cooled down by the third frame 230.

A front cover 150 is coupled to a front-most surface of the digital camera, and a rear cover 270 is disposed on a rear portion of the first display unit 10. A side cover 275 that is extended forward to cover at least some parts of edges of at least one of the first frame 210, the second frame 220, the third frame 230, the battery 260, the PCB 250, the first display unit 10, and the second display unit 20 is connected to the rear cover 270.

In the present embodiment, the second display unit 20 is attached to the front cover 150, and thus, the side cover 275 does not cover the edges of the second display unit 20. However, a size of the second display unit 20 may be increased, and the side cover 275 may be modified to cover a part of the edges of the second display unit 20.

An inlet hole 275a, in which the battery 260 is inserted, is formed in the side cover 275. A battery cover 278 is installed on the side cover 275 to be rotatable so as to open or close the inlet hole 275a.

The first frame 210 and the second frame 220 are disposed to extend toward the inlet hole 275a so as to guide the movement of the battery 260 when the battery 260 is inserted through the inlet hole 275a. In addition, when the battery 260 is completely inserted in the digital camera through the inlet hole 275a, the first frame 210 and the second frame 220 respectively contact both surfaces of the battery 260 to receive the battery 260 and cool down the heat generated from the battery 260.

Figure 9:
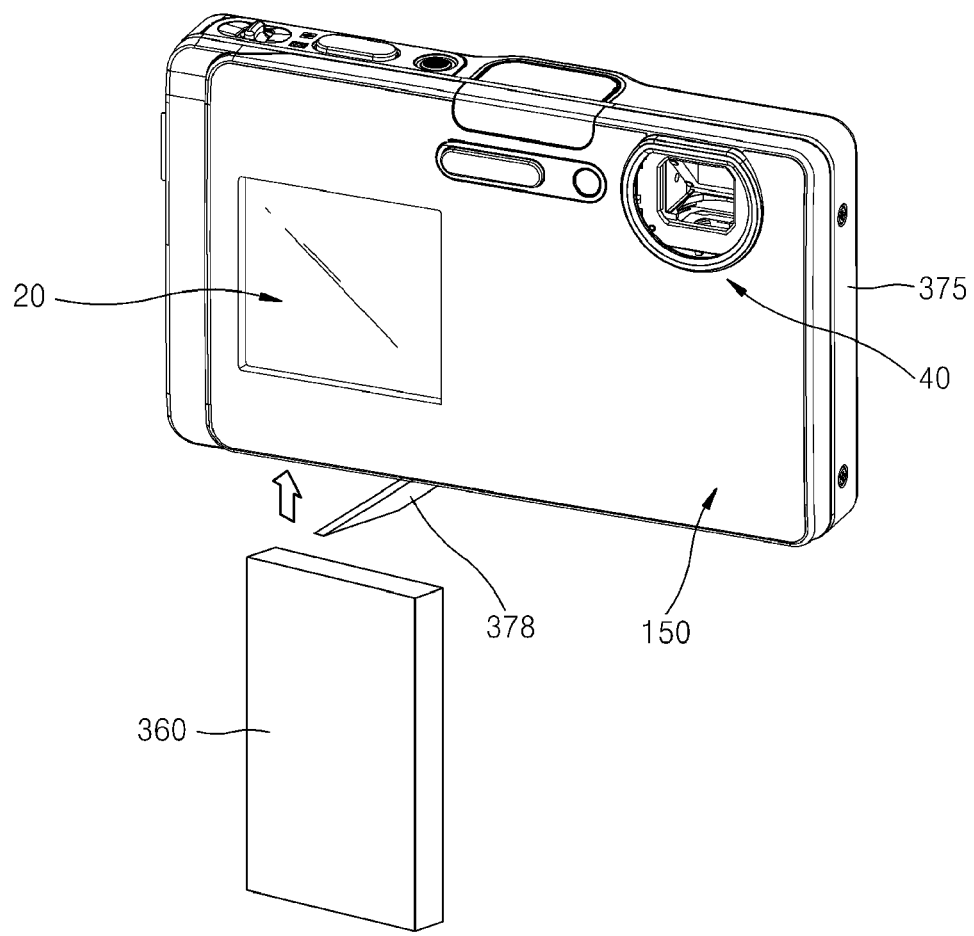
FIG. 9 is a perspective view of a front surface of a digital camera according to another embodiment of the present invention.
Figure 10:
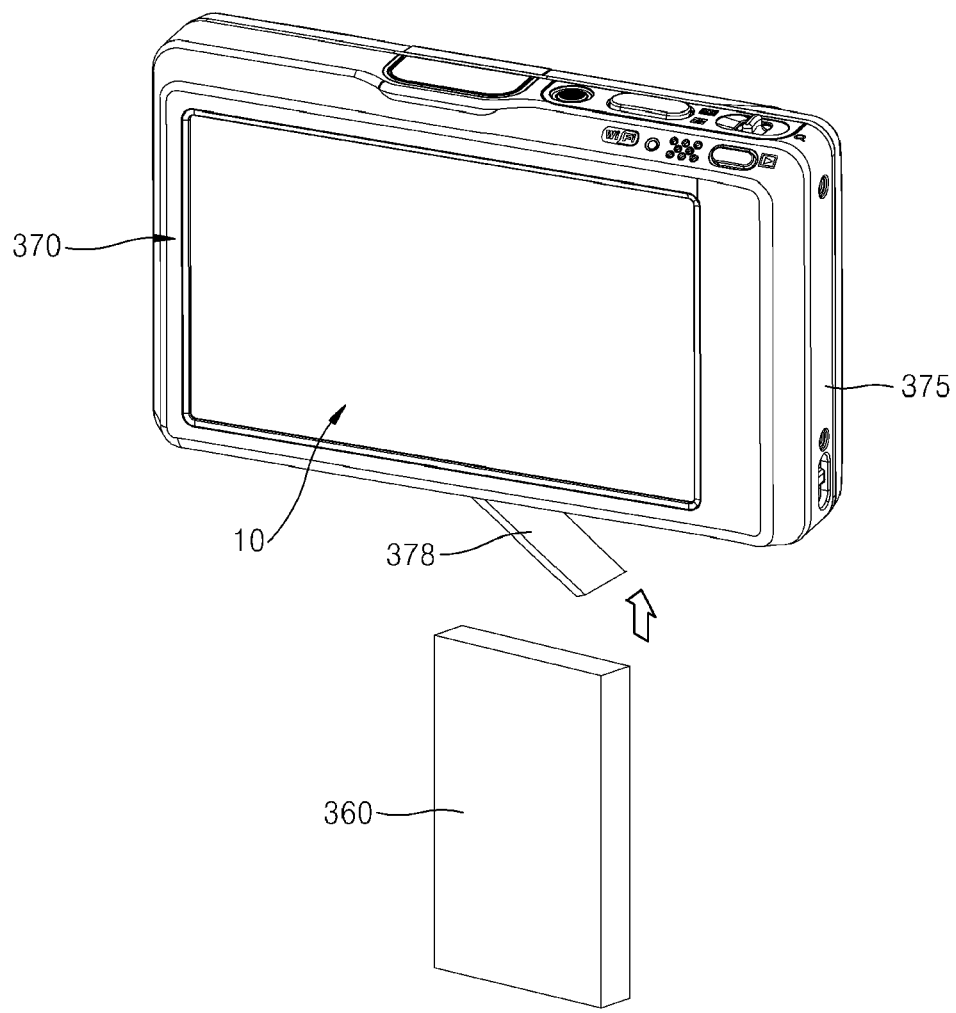
FIG. 10 is a perspective view of a rear surface of the digital camera of FIG. 9.

FIG. 9 is a perspective view of a front surface of a digital camera according to another embodiment of the present invention, and FIG. 10 is a perspective view of a rear surface of the digital camera of FIG. 9.

Referring to FIG. 9, the second display unit 20 is seen in the front cover 150 of the digital camera. When a user of the digital camera may take a picture of himself/herself while identifying imaging information such as focus or driving through the second display unit 20. A battery cover 378 is installed to be rotatable at a portion, in which a battery 360 is inserted, in a side cover 375 that surrounds the side surfaces of the digital camera.

In addition, referring to FIG. 10, the first display unit 10 is seen in a rear cover 370 of the digital camera. The user of the digital camera may check live-view images or captured images by using the first display unit 10, and may use menu for manipulating the digital camera.

Figure 11:
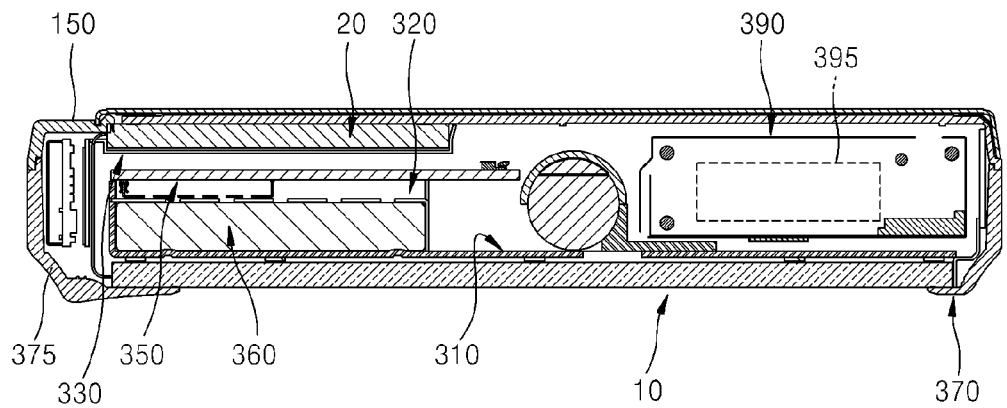
FIG. 11 is a transverse cross-sectional view of the digital camera of FIG. 9.
Figure 12:
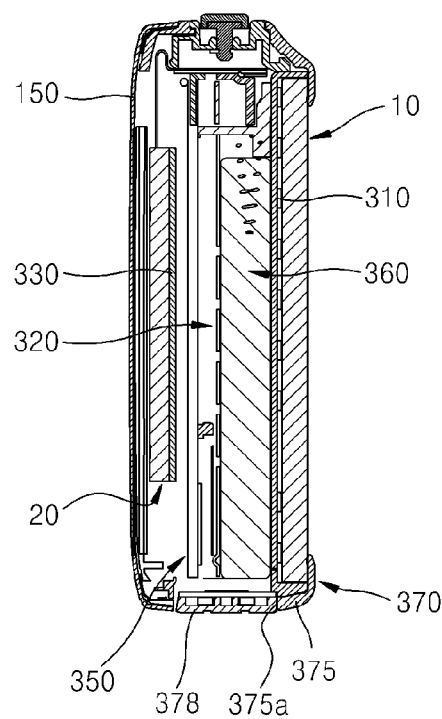
FIG. 12 is a longitudinal cross-sectional view of the digital camera of FIG. 9.

FIG. 11 is a transverse cross-sectional view of the digital camera of FIG. 9, and FIG. 12 is a longitudinal cross-sectional view of the digital camera of FIG. 9.

The digital camera shown in FIGS. 11 and 12 includes a first frame 310, an imaging unit 395 disposed on a front portion of the first frame 310, an optical system 390 for focusing image light on the imaging unit 395, the first display unit 10 disposed on the rear portion of the first frame 310, a battery 360 that is a first heat generator disposed on a front portion of the first frame 310, a second frame 320 disposed on a front portion of the battery 360, a PCB 350 that is a second heat generator disposed on a front portion of the second frame 320, a third frame 330 disposed on a front portion of the PCB 350, and the second display unit 20 disposed on a front portion of the third frame 330.

The optical system 390 in the digital camera shown in FIGS. 11 and 12 uses an inner focusing lens barrel type, in which arrangement of lenses is changed inside the digital camera without extending or contracting the lens barrel in the back-and-forth direction, in order to perform the zooming function and the focusing function.

The heat generating between the battery 360 and the first display unit 10 may be cooled down by the first frame 310, and the heat generating between the PCB 350 and the second display unit 20 may be cooled down by the third frame 330.

A front cover 150 is coupled to the front-most surface of the digital camera, and a rear cover 370 is disposed on a rear portion of the first display unit 10. A side cover 375 extending forward to cover at least some parts of the edges of at least one of the first frame 310, the second frame 320, the third frame 330, the battery 360, the PCB 350, the first display unit 10, and the second display unit 20 is connected to the rear cover 370.

In the present embodiment, since the second display unit 20 is attached to the front cover 150, the side cover 375 does not cover the edges of the second display unit 20. However, a size of the second display unit 20 may be increased, and the side cover 375 may be modified to cover a part of the edges of the second display unit 20.

An inlet hole 375a, in which the battery 360 is inserted, is formed in the side cover 375. A battery cover 378 is installed to be rotatable on the side cover 375 so as to open or close the inlet hole 375a.

The first frame 310 and the second frame 320 are disposed to extend toward the inlet hole 375a so as to guide the movement of the battery 360 when the battery 360 is inserted through the inlet hole 375a. In addition, when the battery 360 is completely inserted in the digital camera through the inlet hole 375a, the first frame 310 and the second frame 320 respectively contact both surfaces of the battery 360 to receive the battery 360 and cool down the heat generated from the battery 360.

Figure 13:
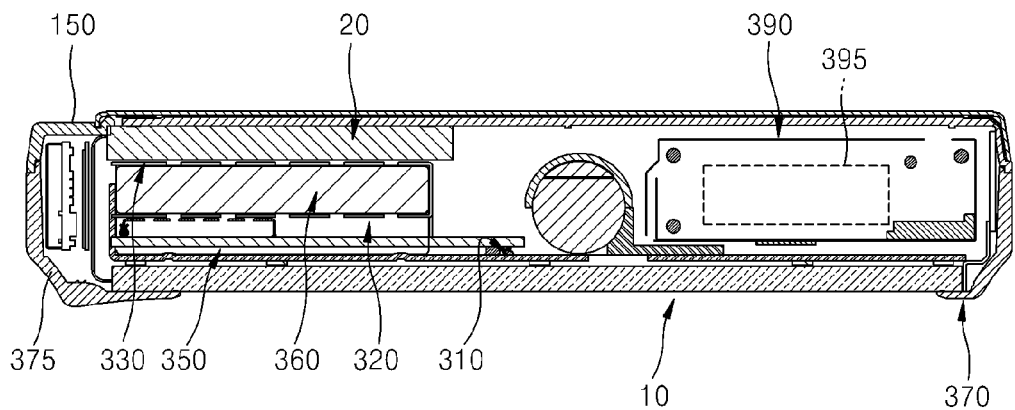
FIG. 13 is a transverse cross-sectional view of a digital camera according to another embodiment of the present invention.
Figure 14:
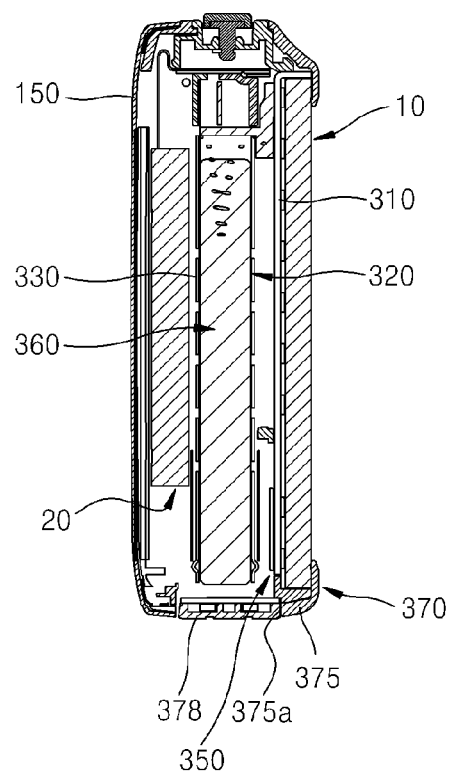
FIG. 14 is a longitudinal cross-sectional view of the digital camera of FIG. 13.

FIG. 13 is a transverse cross-sectional view of a digital camera according to another embodiment of the present invention, and FIG. 14 is a longitudinal cross-sectional view of the digital camera of FIG. 13.

The digital camera illustrated in FIGS. 13 and 14 has a similar structure to that of the digital camera illustrated in FIGS. 11 and 12 except for locations of the PCB 350 and the battery 360. In FIGS. 13 and 14, the same reference numerals as those of FIGS. 11 and 12 denote the same components.

The PCB 350 is disposed between the first frame 310 and the second frame 320, and the battery 360 is disposed between the second frame 320 and the third frame 330. Therefore, the heat generated between the battery 360 and the first display unit 10 may be cooled down by the first frame 310, and the heat generated between the PCB 350 and the second display unit 20 may be cooled down by the third frame 330.

Figure 15:
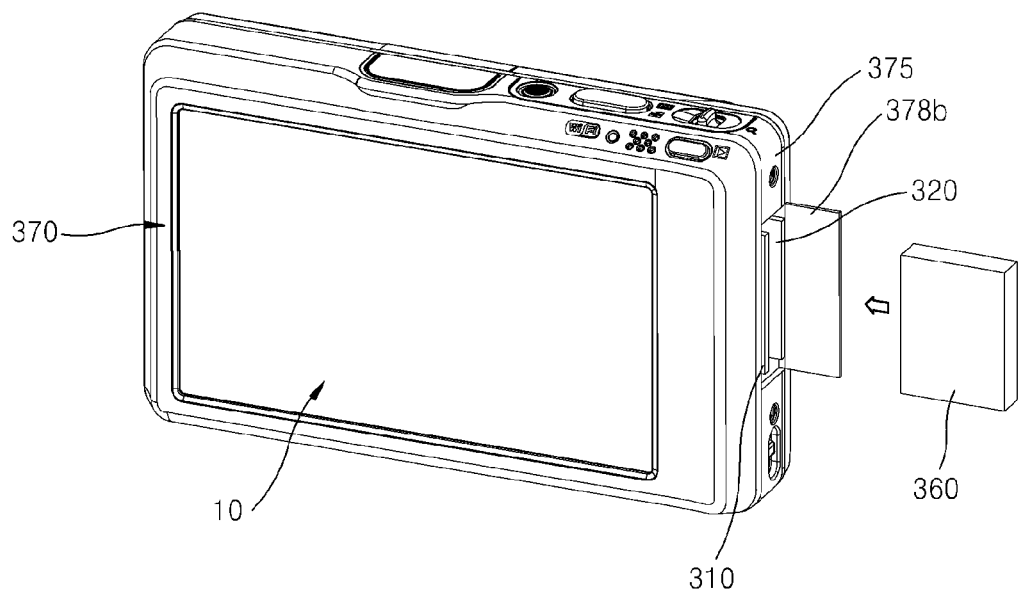
FIG. 15 is a perspective view of a rear surface of a digital camera according to another embodiment of the present invention.

FIG. 15 is a perspective view of a rear surface of a digital camera according to another embodiment of the present invention.

The digital camera shown in FIG. 15 has a similar structure to that of the digital camera shown in FIG. 10 except for a type of inserting the battery 360. In FIG. 15, the same reference numerals as those of FIG. 10 denote the same components as those of FIG. 10.

In the digital camera illustrated in FIG. 15, the first display unit 10 is seen in a rear cover 370 of the digital camera. The user of the digital camera may check live-view images or captured images by using the first display unit 10, and may use menu for manipulating the digital camera.

In the digital camera shown in FIG. 10, the battery is inserted into a bottom surface of the digital camera. However, in the digital camera of FIG. 15, the battery 360 may be inserted from a right edge of the side cover 375 in a state where the user observes the first display unit 10, and thus, the user's convenience is improved.

A battery cover 378b is installed to be rotatable at a portion, in which the battery 360 is inserted, in the side cover 375 surrounding the side surfaces of the digital camera. An inlet hole 375b, in which the battery 360 is inserted, is formed in the side cover 375 so as to open toward the right edge of the digital camera. The battery cover 378b is installed to be rotatable in the side cover 375 so as to open or close the inlet hole 375b.

The first frame 310 and the second frame 320 are disposed to extend toward the inlet hole 375b so as to guide the movement of the battery 360 when the battery 360 is inserted through the inlet hole 375b. In addition, when the battery 360 is completely inserted in the digital camera through the inlet hole 375b, the first frame 310 and the second frame 320 respectively contact both surfaces of the battery 360 to receive the battery 360 and cool down the heat generated from the battery 360.

Accordingly, since the heat transferring structures are disposed between the heating elements such as the plurality of display devices, the circuit board, and the battery for transferring and reducing the heat, the heat in the digital camera may be efficiently reduced. In addition, since the various elements generating the heat share the heat transferring structures, a very thin digital camera may be fabricated.

The device described herein may comprise a processor, a memory for storing program data and executing it, a permanent storage such as a disk drive, a communications port for handling communications with external devices, and user interface devices, including a display, keys, etc. When software modules are involved, these software modules may be stored as program instructions or computer readable codes executable on the processor on a computer-readable media, such as read-only memory (ROM), random-access memory (RAM), CD-ROMs, magnetic tapes, floppy disks, and optical data storage devices. The computer readable recording medium can also be distributed over network coupled computer systems so that the computer readable code is stored and executed in a distributed fashion. This media can be read by the computer, stored in the memory, and executed by the processor.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The present invention may be described in terms of functional block components and various processing steps. Such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, where the elements of the present invention are implemented using software programming or software elements the invention may be implemented with any programming or scripting language such as C, C++, Java, Assembly, or the like, with the various algorithms being implemented with any combination of data structures, objects, processes, routines or other programming elements. Functional aspects may be implemented in algorithms that are executed in one or more processors. Furthermore, the present invention may employ any number of conventional techniques for electronics configuration, signal processing and/or control, data processing and the like. The words "mechanism" and "element" are used broadly and are not limited to mechanical or physical embodiments, but can include software routines in conjunction with processors, etc.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The use of the terms "a" and "an" and "the" and similar referents in the context of describing the invention (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein are not confined to a specific order and can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the spirit and scope of the present invention.

What is claimed is:
1. A digital camera comprising:
a first frame formed of a thermal conductive material;
an imaging unit disposed in front of the first frame for converting image light into an electric signal;
an optical system including lenses and focusing the image light on the imaging unit;
a first display unit disposed on a rear portion of the first frame;
a first heat generator located at a side surface of the optical system and disposed on a front portion of the first frame, wherein the first heat generator generates heat;

a second heat generator disposed on a front portion of the first heat generator, wherein the second heat generator generates heat;

a second frame formed of a thermal conductive material, and disposed between the first heat generator and the second heat generator;

a third frame formed of a thermal conductive material, and disposed on a front portion of the second heat generator; and a second display unit disposed on a front portion of the third frame.

2. The digital camera of claim 1, further comprising a thermal conductive sheet disposed between the first frame and the first display unit to transfer the heat generated by the first display unit to the first frame.

3. The digital camera of claim 1, wherein the first heat generator is a circuit board, and the second heat generator is a battery.

4. The digital camera of claim 3, further comprising a side cover for covering at least a part of edges of the first frame, the second frame, the third frame, the first heat generator, the second heat generator, the first display unit, and the second display unit, wherein the side cover comprises an inlet hole, in which the second heat generator is inserted, and the second frame and the third frame are extended toward the inlet hole so as to guide the insertion of the second heat generator and contacting both surfaces of the second heat generator to receive the second heat generator.

5. The digital camera of claim 4, wherein the second frame and the third frame respectively comprise a plurality of ventilation holes for guiding air to flow to the second heat generator.

6. The digital camera of claim 5, wherein the second frame and the third frame are formed of a thermal conductive metal plate.

7. The digital camera of claim 1, wherein the first heat generator is a battery and the second heat generator is a circuit board.

8. The digital camera of claim 7, further comprising a side cover for covering at least a part of edges of at least one of the first frame, the second frame, the third frame, the first heat generator, the second heat generator, the first display unit, and the second display unit, wherein the side cover comprises an inlet hole, in which the first heat generator is inserted, and the first frame and the second frame are extended toward the inlet hole so as to guide the insertion of the first heat generator and contacting both surfaces of the first heat generator to receive the first heat generator.

9. The digital camera of claim 8, wherein the first frame and the second frame respectively comprise a plurality of ventilation holes for guiding air to flow to the first heat generator.

10. The digital camera of claim 9, wherein the second frame and the third frame are formed of a thermal conductive metal plate.

11. The digital camera of claim 1, wherein the first frame comprises a first accommodation hole surrounding an edge of the imaging unit.

12. The digital camera of claim 11, further comprising a thermal conductive sheet disposed between the first frame and the first display unit to transfer the heat generated by the first display unit to the first frame, wherein the thermal conductive sheet has a second accommodation hole at a location corresponding to that of the first accommodation hole of the first frame.

13. The digital camera of claim 1, wherein the second frame comprises a plurality of ventilation holes for guiding air to flow between the first heat generator and the second heat generator.

14. The digital camera of claim 1, wherein the third frame comprises a plurality of ventilation holes for guiding air to flow between the second heat generator and the second display unit.

15. The digital camera of claim 1, wherein the first display has a size that covers regions corresponding to the optical system and the second display unit, and the first frame has a size corresponding to the first display unit so that the heat generated in a region where the first display unit and the second display unit overlap with each other may be transferred to a region where the optical system is located.

16. The digital camera of claim 1, further comprising a rear cover which includes a rear display window formed at a location corresponding to the first display unit and is disposed on a rear portion of the first display unit to surround an edge of the first display unit.

17. The digital camera of claim 16, further comprising a front cover which includes an imaging window that receives the optical system and a front display window formed at a portion corresponding to the second display unit, and is coupled to the front portion of the second display unit.

* * * * *